(12) United States Patent
Konneker

(10) Patent No.: US 11,967,303 B2
(45) Date of Patent: Apr. 23, 2024

(54) LIGHT POWERED CHIME WITH ROTATING ELECTRONICS AND MOTOR SUSPENDED TORSIONALLY BY ITS SHAFT

(71) Applicant: Lloyd Kent Konneker, Raleigh, NC (US)

(72) Inventor: Lloyd Kent Konneker, Raleigh, NC (US)

( * ) Notice: Subject to any disclaimer, the term of this patent is extended or adjusted under 35 U.S.C. 154(b) by 488 days.

(21) Appl. No.: 17/171,346

(22) Filed: Feb. 9, 2021

(65) Prior Publication Data
US 2021/0248987 A1 Aug. 12, 2021

Related U.S. Application Data

(60) Provisional application No. 62/705,424, filed on Jun. 26, 2020, provisional application No. 62/971,919, filed on Feb. 8, 2020.

(51) Int. Cl.
*G10K 1/064* (2006.01)
*G10K 1/067* (2006.01)
*H02S 99/00* (2014.01)

(52) U.S. Cl.
CPC ............. *G10K 1/064* (2013.01); *G10K 1/067* (2013.01); *H02S 99/00* (2013.01)

(58) Field of Classification Search
CPC ........ G10K 1/064; G10K 1/067; H02S 99/00; Y02E 10/50
See application file for complete search history.

(56) References Cited

U.S. PATENT DOCUMENTS

| | | | |
|---|---|---|---|
| 1,590,524 A | 6/1926 | Keydel | |
| 5,072,208 A * | 12/1991 | Christensen | G10K 1/067 340/392.4 |
| 5,208,578 A * | 5/1993 | Tury | G10K 1/067 116/141 |
| 5,369,391 A * | 11/1994 | Gadsby | G10K 1/067 116/141 |
| 5,369,578 A | 11/1994 | Gadsby | |
| 5,831,516 A * | 11/1998 | Jennings | G08B 3/00 340/392.4 |
| 6,239,692 B1 * | 5/2001 | Maguire | G10K 1/067 340/392.1 |
| 6,559,367 B1 * | 5/2003 | Yiu | G10K 1/067 340/392.4 |
| 6,906,254 B2 | 6/2005 | Reed | |
| 9,149,732 B2 | 10/2015 | Konneker | |
| 10,796,679 B1 * | 10/2020 | Powell | H02K 7/061 |
| 10,823,350 B1 * | 11/2020 | Richmond | F21S 9/037 |

* cited by examiner

*Primary Examiner* — Jeffrey Donels

(57) ABSTRACT

A light-powered, electromechanical chime has a striker assembly (3) inside a bell (1). The striker assembly contains a clapper (6) and electronics, including a light collector (7) and a motor (10.) The striker assembly is suspended by a torsion element (2) attached to the shaft (11) of the motor. Light causes the motor to wind the torsion element, then the unwinding torsion element causes the striker assembly to rotate and the clapper to strike the bell.

3 Claims, 1 Drawing Sheet

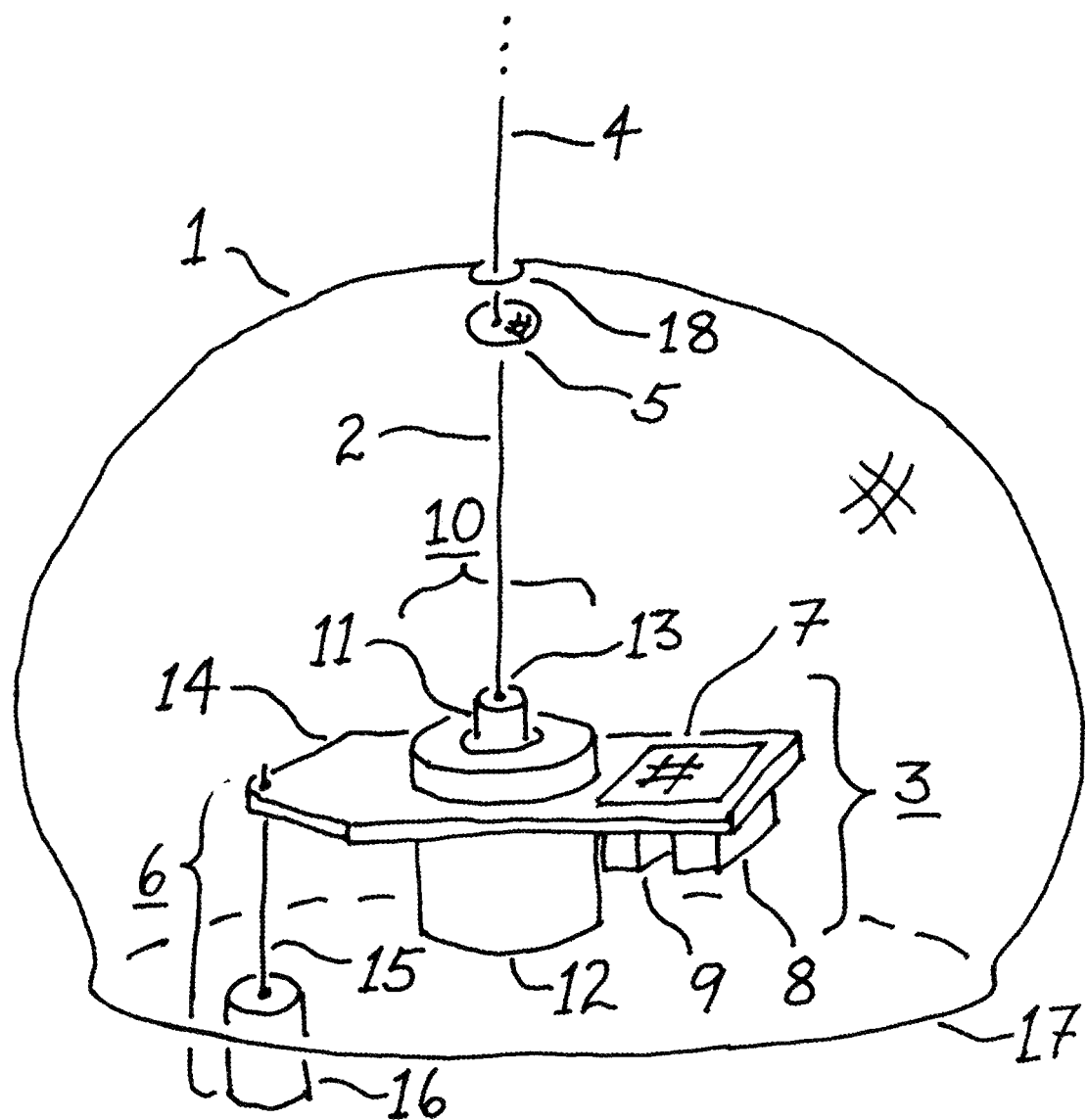

LIGHT POWERED CHIME WITH ROTATING ELECTRONICS AND MOTOR SUSPENDED TORSIONALLY BY ITS SHAFT

CROSS-REFERENCE TO RELATED APPLICATIONS

This application claims the benefit of PPA Ser. No. 62/971,919 filed 2020 Feb. 9 and PPA Ser. No. 62/705,424 filed 2020 Jun. 26 by the present inventor, which is incorporated herein by reference.

BACKGROUND

Chimes produce sound when a striker contacts a resonant body such as a bell. Indoor chimes often use electromechanical motive force for the striker.

Electrical energy can be provided by power mains, battery, or light energy. Light energy is collected by a solar panel. Light energy is free and uses no connection to power mains. Outdoor light energy is strong but indoor artificial light energy is weak.

A striker should have enough mass to produce an audible volume of sound. But a large mass needs more energy to move. A large mass also suffers more friction.

When light energy is weak, energy can be accumulated and stored until the amount of stored energy is enough to move a striker. An electronic control system can sense the amount of stored energy and occasionally switch a pulse of energy to move a striker.

People may want a chime that does not ring continuously, but that rings chaotically and that occasionally comes to silent rest.

Motors and solenoids can provide electromechanical motive force. Motors can produce rotary motion which in a chime may have a pleasing visual effect.

A motor has a starting torque, requiring more current than to keep the motor rotating. The starting torque is due to the inertia of the motor rotor and load, and due to stiction of bearings, the friction which tends to prevent surfaces in contact from sliding.

A solar panel is planar and produces the most energy when it faces the strongest ambient light. A solar panel moving in its own plane gathers as much energy as when it is stationary.

A solar panel has a maximum power point, a voltage and current at which the panel produces the most power. A solar panel produces some current but very little power in the short circuit condition, that is, at near zero voltage.

U.S. Pat. No. 5,208,578 (Tury) teaches a light-powered chime. Tury has a solar panel and motor both mounted in a base. Resonant tubes are also suspended from the base (col. 2 line 62.) The motor shaft is connected to a striker by a string (col. 2 lines 54-57.) The striker is suspended between the resonant tubes so that when rotated it strikes them. Tury teaches the striker may come to rest against one of the resonant tubes (col. 3 line 12). Tury teaches that as the motor turns, the string may wind up and store energy and that the striker rotates as the string unwinds (col. 2 lines 58-60.)

In Tury the electronics and motor are in a base outside the volume of the resonant body. This is disadvantageous because the base adds to total bulk.

In Tury, only the mass of the striker contributes to the rotary momentum of the striker. The mass of the motor and electronics does not contribute. This is disadvantageous because it uses extra dead-weight mass in the striker.

Tury teaches that the striker may come to rest against one of the resonant tubes. One may say that the striker is stuck against the resonant tube past which the striker should rotate. This has the disadvantage that the starting torque needed to start the striker rotating is increased.

U.S. Pat. No. 5,369,391 (Gadsby) teaches a light-powered chime. In Gadsby, as in Tury, the motor is in a mounting plate or base and the motor shaft spins a clapper or striker hanging between chime tubes. The striker is "flexibly attached to the shaft of the electric motor" (col. 2 lines 17-19.) The striker comprises a bead on the lower end of a flexible cord (col. 2 lines 24-27.) The striker at rest does not contact the chime tubes. The striker is "adapted to randomly swing and collide with the chime tubes when the clapper is rotated by the shaft of the electric motor" (col. 2 lines 19-22.) Gadsby does not explain the physics that would cause the clapper to randomly swing. Gadsby does not teach that the cord is torsionally flexible i.e. winds and unwinds. One might surmise that the rotating cord would amplify any small, off-axis perturbations of the bead if the cord is torsionally stiff and the rotation is fast enough.

Like Tury, Gadsby has the disadvantage that the volume of the base increases the bulk of the chime.

Like Tury, Gadsby has the disadvantage that the mass of the motor and electronics does not contribute to the momentum of the striker.

In Gadsby, for the striker to contact the chime tubes, one might surmise the striker should rotate rapidly and the cord should be torsionally stiff but laterally flexible. This has the disadvantage that the motor should be larger with higher starting torque. Gadsby also has the disadvantage that the violent action of the striker can startle the viewer.

U.S. Pat. No. 6,906,254 (Jennings) teaches an electromechanical chime. Jennings has a hammer assembly suspended surrounded by a plurality of chime tubes (col. 1 lines 48-50.) The hammer assembly encloses a motor and an associated eccentric rotor (col. 1 lines 50-52) which moves the whole hammer assembly laterally around a central axis so that the hammer assembly strikes the chime tubes (col. 1 lines 54-57). A control unit with batteries hangs by an electric cord from the hammer assembly (col. 1 lines 57-58.) The control unit serves both as a traditional wind vane and as a power source for the hammer assembly.

Jennings has the disadvantage that the eccentric rotor is hard on the motor bearings.

In Jennings the eccentric rotor "forms an integral part of the motor" (col. 4 lines 23.) This is disadvantageous since it precludes using off-the-shelf motors.

In Jennings, the eccentric rotor adds mass to the usual symmetric rotor of a motor. This is disadvantageous because it increases the starting torque of the motor.

In Jennings, the hammer assembly is suspended by its housing and is "supported in a triangular fashion . . . so the hammer can be supported horizontally" (col. 4 lines 14-18.) This is disadvantageous because it has more components and assembly steps.

Jennings has a long wire to the separate control module. This has the disadvantage that it is not compact and not easy to hide or decorate.

U.S. Pat. No. 9,149,732 (Konneker) teaches a light-powered mobile. In Konneker, a motor is suspended by flexible means to the shaft of the motor. The motor is on a beam, near a center of gravity. Electronics to drive the motor are on one end of the beam to balance a simple weight, or recursively another suspended beam, on the opposite end of the beam. The beam spins under light power. One may construe Konneker as a chime striker where the weight on one end of the beam strikes a chime.

Konneker as a chime striker external to a resonant body has the disadvantage that it is not compact.

Konneker as a chime striker external to a resonant body has the disadvantage that it can stick on the resonant body and so needs more starting torque of the motor.

Angel chimes, or angel-abras have long been known. See for example U.S. Pat. No. 1,590,524 (Keydel, 1923.) In an angel chime, a rotating plate is driven by air currents from candles beneath it. Pendulum strikers hung from the rotating plate swing laterally outward to strike one or more bells. Also known are angel chimes where the rotating plate is driven by electric motors. Angel chimes have the disadvantages that they are not compact and need energy replenishment.

SUMMARY

In an embodiment of the present invention, a substantially hollow resonant body is suspended or supported. For example, the resonant body is a bell or circular arrangement of tubes.

A clapper comprises a weight on the distal end of a rod.

A striker assembly comprises a light collector, electrical storage, electronic control, a motor, and the clapper. The light collector feeds electrical energy to the storage. The electronic control periodically switches pulses of energy from the storage to the motor.

The striker assembly is suspended inside the hollow of the resonant body by a torsion means such as a nylon line. The top of the torsion means is attached near the top center of the resonant body. The bottom of the torsion means is attached to the vertical shaft of the motor of the striker assembly.

When the electronic control switches a pulse of energy to the motor, the motor shaft spins briefly to quickly wind up the torsion means. Then the torsion means slowly unwinds, spinning the entire striker assembly.

The striker assembly is balanced so that its center of gravity is beneath the attachment of the torsion means to the vertical motor shaft. The center of gravity is on the axis of the motor shaft. For example, the light collector, storage, and electronic control are arranged to one side of the motor and the clapper is on the opposite side.

At rest, the clapper is near the resonant body. When the torsion means unwinds and rotates the striker assembly, the clapper moves under centrifugal force and strikes the resonant body producing a pleasing sound.

The pulses of energy may be infrequent enough to allow the striker to return to quiet rest. The electronic control produces pulses of energy so that the electrical storage is not discharged much below the maximum power point voltage of the light collector so that the light collector continues to deliver high power to storage.

The invention is placed decoratively, often indoors, for example hung in a window or from the ceiling. The device makes pleasing sounds and pleasing motion. The effects vary according the to amount of ambient light.

Advantages

Accordingly, several advantages of one or more aspects are as follows: to provide a chime that is reliable and long lived, that is easily manufactured, that uses few parts, that uses standard, low-cost parts, that is lightweight and compact to offer more choices for siting, that does not get stuck, that economically uses mass of the motor and electronics to contribute rotary momentum to a striker, that uses few dead weights, that does not subject motor bearings to a rotating eccentric mass, that uses a small motor having low starting torque, that uses free ambient light, that is not connected to power mains, that uses no batteries, that chimes even in low light, that presents a slow and calming motion to a viewer, that is easily decorated, and that provides chaotic and pleasing sound.

DRAWINGS—FIGURES

FIG. 1 shows an isometric view of a various aspects of one embodiment.

DRAWINGS—REFERENCE NUMERALS 1 resonant body
2 torsion means
3 striker assembly
4 suspension means
5 stopper
6 clapper
7 collector means
8 storage means
9 control means
10 motor means
11 motor shaft
12 motor housing
13 working end
14 printed circuit board
15 rod
16 weight
17 rimmed opening
18 pierced opening

DETAILED DESCRIPTION—FIG. 1—FIRST EMBODIMENT

FIG. 1 shows a resonant body 1, substantially hollow. Resonant body 1 is a glass bell having a large rimmed opening 17 at the bottom and a small pierced opening 18 at the top.

A torsion means 2 hangs vertically inside resonant body 1 substantially on the vertical axis of resonant body 1. The top end of torsion means 2 is held near the top center of resonant body 1.

A suspension means 4 is a line that passes through pierced opening 18. A stopper 5 is swaged onto suspension means 4 below pierced opening 18 to support resonant body 1. Stopper 5 for example is a pierced, ductile, metal ball. Torsion means 2 is an extension of suspension means 4 and the top end of torsion means 2 is also fixed by stopper 5. Resonant body 1 rests on stopper 5. Contact between resonant body 1 and stopper 5 has friction which prevents stopper 5 and the top end of torsion means 2 from twisting, by the mass of resonant body 1. Resonant body 1 can be lifted above stopper 5 during assembly or later.

Suspension means 4 and torsion means 2 are different segments of one continuous nylon line. The line is thin enough that torsion means 2 twists easily, but strong enough that suspension means 4 resists breaking.

A clapper 6 is a weight 16 on the distal end of a rod 15.

The proximal end of rod 15, a collector means 7, a storage means 8, a control means 9, and a motor means 10 are soldered to a printed circuit board 14 to form a striker assembly 3.

Collector means 7 is for example a solar panel. Storage means 8 is for example a capacitor. Control means 9 is for example an integrated circuit.

Motor means 10 comprises a motor shaft 11 and a motor housing 12. Motor means 10 converts electrical energy into rotational motion of motor shaft 11 with respect to motor housing 12. Motor housing 12 is fixed to striker assembly 3 so that the axis of rotation of motor shaft 11 is vertical. Motor housing 12 is for example pressed into a hole in printed circuit board 14.

A working end 13 of motor shaft 11 is exposed outside motor housing 12. The center of working end 13 is on the axis of rotation of motor shaft 11.

The lower end of torsion means 2 is attached to the center of working end 13. Thereby striker assembly 3 is suspended by torsion means 2. Motor means 10 is capable of bearing axial thrust since motor means 10 axially carries the gravitational mass of striker assembly 3.

Attachment of the lower end of torsion means 2 to working end 13 is for example by glue, by a ferrule, or by looping the lower end of torsion means 2 through an eye through working end 13.

Motor means 10 is small and ungeared, having low starting torque, but can easily twist torsion means 2.

At rest, weight 16 of clapper 6 assumes a position near rimmed opening 17 of resonant body 1.

Striker assembly 3 has a center of gravity. At rest the center of gravity is substantially on the axis of rotation of motor shaft 11 and the center of gravity is substantially beneath the attachment of torsion means 2 to working end 13. Torsion means 2, the axis of rotation of motor shaft 11, and the gravity vector through the center of gravity are substantially collinear.

Weight 16 of clapper 6 is offset from the center of gravity, counterbalanced by other elements of striker assembly 3 on the opposite side of the center of gravity. The center of mass of weight 16 is lower than the center of mass of the counter balancing elements of striker assembly 3.

FIG. 1 illustrates one arrangement of striker assembly 3, having clapper 6 attached on one side of printed circuit board 14, and having collector means 7, storage means 8, and control means 9 attached on the opposite side of printed circuit board 14 as counterbalancing elements.

It is desirable that any arrangement avoids the need for dead mass in striker assembly 3 to achieve balance, since dead mass adds to stress on motor means 10.

Operation

At rest, torsion means 2 is unwound, striker assembly 3 is motionless, and weight 16 is near but does not contact rimmed opening 17 of resonant body 1.

Light energy that strikes collector means 7 is stored in storage means 8. Control means 9 senses when sufficient energy is stored and then control means 9 switches a pulse of electrical energy to motor means 10. The pulse of electrical energy causes motor means 10 to rotate motor shaft 11, thereby twisting and winding torsion means 2. The inertia of resonant body 1 substantially keeps the upper end of torsion means 2 from rotating resonant body 1. Torsion means 2 stores kinetic energy without appreciably rotating striker assembly 3, whose inertia counters the torque that is equal and opposite to the torque that twists torsion means 2.

When a pulse ends, torsion means 2 unwinds, slowly accelerating and rotating striker assembly 3. As striker assembly 3 rotates, weight 16 moves due to centrifugal force and strikes resonant body 1.

Control means 9 produces a pulse of such duration and power to ensure that weight 16 strikes resonant body 1. Weight 16 striking resonant body 1 causes chaotic motion of striker assembly 3 so that weight 16 may strike resonant body 1 many times for the same pulse, at different points around rimmed opening 17.

After a pulse, torsion means 2 may unwind completely, striker assembly 3 stop rotating, weight 16 fall out of contact with rimmed opening 17, and the device return to rest.

When striker assembly 3 rotates it tilts. Weight 16 moves laterally outward and axially upward so that its center of mass is in the same rotational plane as the center of mass of the counterbalancing elements. The center of mass of the counterbalancing elements and the working end 13 also move laterally outwards and axially downwards in the opposite direction of weight 16. The center of gravity of the tilted, rotating striker assembly 3 remains substantially below pierced opening 18. As striker assembly 3 rotates and tilts, torsion means 2 may assume a small angle to the axis of rotation of motor shaft 11, but the motor shaft 11 is not then turning in motor housing 12.

Control means 9 produces pulses with frequency determined by the strength of ambient light, low frequency in weak light and high frequency in strong light. In very strong light torsion means 2 might not completely unwind and the device not come to rest. In such case, chaotic motion continues and weight 16 continues to strike at different points around rimmed opening 17.

Control means 9 does not limit pulses to a low maximum frequency. When ambient light is great then the pulse frequency is high, striker assembly 3 might rotate continuously, and weight 16 might not strike resonant body 1 but instead continuously slide along rimmed opening 17 of resonant body 1. In practice, this is rare, since variations in the circularity of rimmed opening 17 and variations in the concentricity 1 of rimmed opening 17 with pierced opening 18 all combine to produce chaotic motion with high probability.

When ambient light is great then the pulse frequency is high, and motor means might turn enough to harm torsion means 2. Torsion means 2 might be harmed for example if it kinks, shortens, and, in the extreme, breaks. Collector means 7 is sized small in area to prevent harm to torsion means 2. Motor means 10 is sized small so that motor means 10 stalls before harming torsion means 2.

Control means 9 allows operation in a wide range of light conditions. Absent control means 9, electrical energy from collector means 7 could continuously flow to storage means 8 and then to motor means 10. Absent control means 9, in low light storage means 8 would soon discharge to a voltage near zero, far from the maximum power point of collector means 7, and collector means 7 would not produce much power, and motor means 10 might not rotate but instead consume energy solely in resistive heat loss. With control means 9, in the same low light, control means 9 occasionally pulses stored energy to motor means 10. Absent control means 9 but with a large collector means 7, in very strong light such as direct sunshine the device may chime continuously.

Control means 9 produces pulses of duration limited by the size of storage means 8. Storage means 8 has enough capacity and a high enough discharge rate to yield a pulse duration long enough and powerful enough to ensure weight 16 strikes resonant body 1.

ALTERNATIVE EMBODIMENTS

In an alternative embodiment, resonant body 1 is a circle of many ringing elements. Resonant body 1 need not be transparent so long as it admits light from some direction.

In an alternative embodiment, suspension means 4 is attached to the top of resonant body 1, for example to an eye, and the top end of torsion means 2 is attached below the top center of resonant body 1. Such a configuration is more difficult to assemble or repair.

In an alternative embodiment, stopper 5 is a ring larger than pierced opening 18. Suspension means 4 and torsion means 2 are lines tied to opposite sides of the ring.

In an alternative embodiment, torsion means 2 is of separate composition from suspension means 4. For example torsion means 2 is a metal spring and suspension means 4 a steel cable.

In an alternative embodiment, resonant body 1 is not suspended but is instead supported by a frame or rubber feet that do not dampen acoustics. Torsion means 2 is attached to an eye on the inside of the top center of resonant body 1 and stopper 5 is not present.

In an alternative embodiment, striker assembly 3 may comprise collector means 7, storage means 8, control means 9, and motor means 10 electrically wired together and held together by potting compound.

In an alternative embodiment, torsion means 2 is stiff and motor means 10 is geared to provide more torque in fewer rotations.

In an alternative embodiment, rod 15 is a flex means such as a flexible line. The upper end of the line is looped through or knotted to a hole on printed circuit board 14.

In an alternative embodiment, rod 15 is attached in the striker assembly by a flex means such as a pivot so as to form a pendulum.

In an alternative embodiment, clapper 6 is a sprung weight that slides outward by centrifugal force.

In an alternative embodiment, collector means 7 faces down so that it never receives direct sunlight but instead collects weaker, reflected light. This reduces the variation in pulse frequency throughout a day. This also prevents strong, direct sunlight from continuously rotating strike assembly 3.

In an alternative embodiment, resonant body 1 comprises many resonant tubes, or has a rimmed opening 17 that is not smooth, so that weight 16 can not slide continuously in strong light.

In an alternative embodiment, control means 9 limits pulses to a low maximum frequency so that the device returns to rest even in strong light.

In an alternative embodiment, control means 9 limits pulses to a low maximum frequency so that torsion means 2 can not be harmed in strong light.

In an alternative embodiment, storage means 8 is sized large enough to store more energy than is needed to ensure weight 16 strikes resonant body 1, and control means 9 limits both pulse duration and frequency. In such an embodiment, the device may continue to chime even after ambient light energy ceases.

Advantages

From the description above, many advantages of some embodiments of the present invention become evident:
a) The electronics and motor within the volume of the resonant body make the chime compact, letting it be hung in a small space.
b) The electronics and motor within the volume of the resonant body protects them from damage and dirt.
c) The chime needs no enclosure for a separate base.
d) The absence of dead weight makes the chime lightweight, letting it be cheaply stored and shipped, and hung without strong supports.
e) The contribution of the mass of the motor and electronics to rotary momentum of the striker makes the chime light in total weight, again letting the chime be easily shipped and hung without strong supports.
f) The absence of eccentric mass on the motor lets the motor bearing last a long time.
g) The absence of eccentric mass on the motor lets an off-the-shelf motor be used without additional manufacturing steps.
h) The use of a torsion element and the absence of dead weight lets the motor be smaller and cheaper. The motor may be smaller because the starting torque is only the small mass of the usual rotor of the motor plus the small load torque of the torsion element.
i) Since at rest the striker does not contact resonant elements, the chime does not stick, thus the motor does not need starting torque to overcome a stuck condition. This lets the motor be smaller and cheaper.
j) The use of a single line for torsion means and suspension means lets the chime be assembled with fewer steps and parts.
k) The chime uses free energy and obviates replacing batteries.
l) The chime is compact and thus easily decorated.
m) The chime is easily fabricated from a few, readily available parts.
n) The chime with fixed clapper resists tangling in shipping.

CONCLUSION, RAMIFICATIONS, AND SCOPE

Thus the reader will see that at least one embodiment of the chime provides a compact, lightweight, yet economical device that produces a pleasing sound.

Furthermore, the compactness of the chime has additional advantages in that:
a) The chime is easily decorated so as to hide the electronics.
b) The solar panel(s) can be incorporated into decoration, for example as wings of a butterfly decoration.
c) The chime is easily cleaned, only the glass bell needing dusting.
d) The chime is symmetrical and fits in a square box that packs tightly.

While the above description contains many specificities, these should not be construed as limitations on the scope. Many other variations are possible.

The invention claimed is:
1. A light powered chime apparatus comprising:
a substantially hollow resonant means that will sound when struck,
a collector means for converting radiant energy into electrical energy,
an energy storage means adapted to storing electrical energy from said collector means,
a motor means for converting electrical energy into rotational motion of a motor shaft with respect to a motor housing,
control means for switching electrical energy from said energy storage means to said motor means,
a clapper means for striking,
and a torsion means for storing rotational kinetic energy,
and wherein a upper end of said torsion means is fixed near the top center of said resonant means so that the torsion means hangs down inside said resonant means,
and wherein a lower end of said torsion means is attached to a working end of said motor shaft so that said rotational motion of said motor shaft applies torque to said lower end of said torsion means to wind said torsion means, and wherein said clapper means, collector means, energy storage means, control means, and motor housing are all attached together as an assembly inside said resonant means, and wherein said clapper means is offset horizontally from said motor means so that said assembly is balanced about its center of gravity in line with said motor shaft and so that said clapper means is near said resonant means, and wherein said control means periodically switches a pulse of electrical energy from said energy storage means to said motor means to wind said torsion means, and wherein said torsion means then unwinds and causes rotational motion of said assembly, causing said clapper means to move under centrifugal force to strike said resonant means.

2. The light powered chime apparatus of claim 1 wherein:
said clapper means is attached fixedly to said assembly,
and wherein the center of mass of said clapper means is lower than the center of mass of counterbalancing elements of said assembly,
and wherein said rotational motion of said assembly causes entire said assembly to seek a horizontal plane of rotation and causing said clapper means to strike said resonant means.

3. The light powered chime apparatus of claim 1 wherein:
said clapper means comprises a weight attached to a flex means,
and said clapper means is attached to said assembly by said flex means,
and wherein said rotational motion of said assembly causes said flex means to flex and said weight to strike said resonant means.

* * * * *